United States Patent Office.

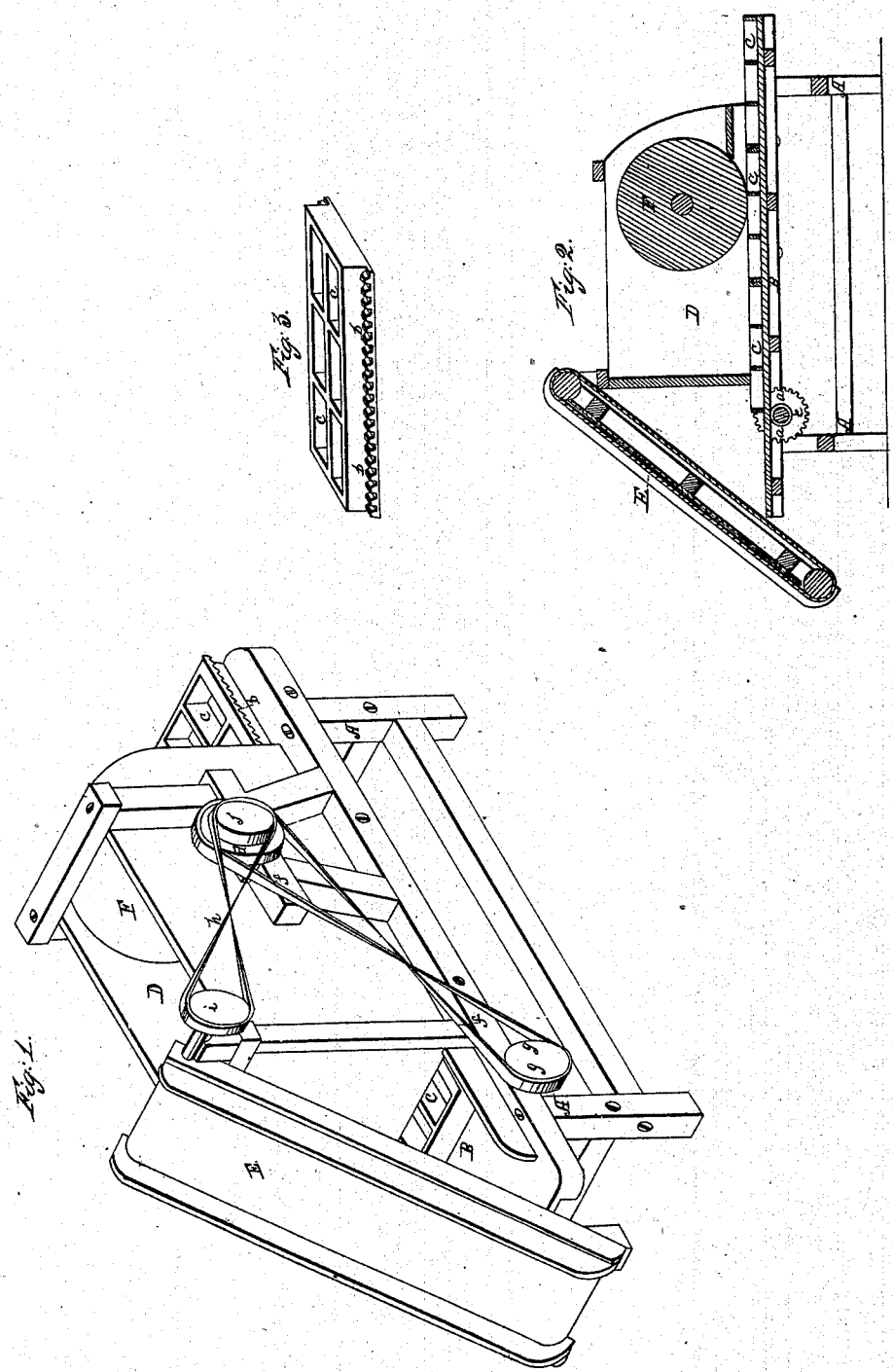

IMPROVED PEAT MACHINE.

JAMES B. LYONS, OF CORNWALL, CONNECTICUT.

Letters Patent No. 60,397, dated December 11, 1866.

*The Schedule referred to in these Letters Patent and making part of the same.*

TO ALL WHOM IT MAY CONCERN:

Be it known that I, JAMES B. LYONS, of the town of Cornwall, in the county of Litchfield, in the State of Connecticut, have invented a new and useful Machine for Striking and Moulding Peat; and the following is a full, clear, and exact description of the same, reference being had to the accompanying drawings, making a part of this specification, in which—

Figure 1 represents a perspective view of the machine complete.

Figure 2 shows a section through a side elevation, moulds, and presser-roller.

Figure 3 shows an underside view of one of the series of moulds.

The object of my invention, is to mould prepared peat, for fuel, and other purposes, in such sized blocks as to be convenient for use and handling, as an article of trade and commerce.

My invention consists in the construction and arrangement of the travelling moulds in the hopper or receiving box, and the mode of carrying the moulds into the machine to receive the peat, and forcing them through, filled and compressed.

To enable others skilled in the art, to make and use my invention, I will describe it in detail, referring to the drawings, and to the letters marked thereon.

I make a substantial frame, A A, of a suitable height, with a bed or table, B, of such length and width as will admit of several sections of the moulds C C C, being placed on and forced in under the box or hopper, D, which receives the ground and prepared peat, which may be conveyed direct from the grinding mill, by the endless apron E, to the hopper, so as to keep a full and constant supply for the moulds, C C, as section after section passes through under the large roller F, which fills and compresses the substance firmly into the moulds, which are emptied for drying, and returned to the table B, where they are forced in by the action of the pinions $a\ a$, working into the racks $b\ b$, on both sides of the moulds. The pinions deriving their motion from the pulleys, $d\ d$, on both sides of the main roller F, by the cross-belts $f\ f$, on to the pulleys $g\ g$, on the ends of the pinion shaft $e$. The endless belt E, also being put in motion by a cross-belt $h$, from the pulley $i$, connecting with the pulley $j$, on the end of the main shaft.

The advantages of my machine are, that, peat can be prepared in a very dry state, and moulded or struck out in solid cakes, for the uses it can be put to, and in a very rapid and economical manner, one machine being capable of striking out or moulding many tons of it in a day, and as it has recently been discovered that peat is valuable for other purposes than its use for fuel, it becomes necessary to prepare it in as compact form, and a dry and solid substance as possible.

Having thus described my invention, what I claim as new, and desire to secure by Letters Patent, is—

The construction of the moulds C C, they having racks $b\ b$, on both sides, for the action of the pinions $a\ a$, to convey them into, and through the receiving box D, as arranged and operating, substantially in the manner and for the purposes herein set forth.

JAMES B. LYONS.

Witnesses:
EGBERT E. PARDEE,
HARRY J. THOMPSON.